No. 877,638. PATENTED JAN. 28, 1908.
C. S. DOUGHERTY.
FENCE POST.
APPLICATION FILED JUNE 20, 1907.
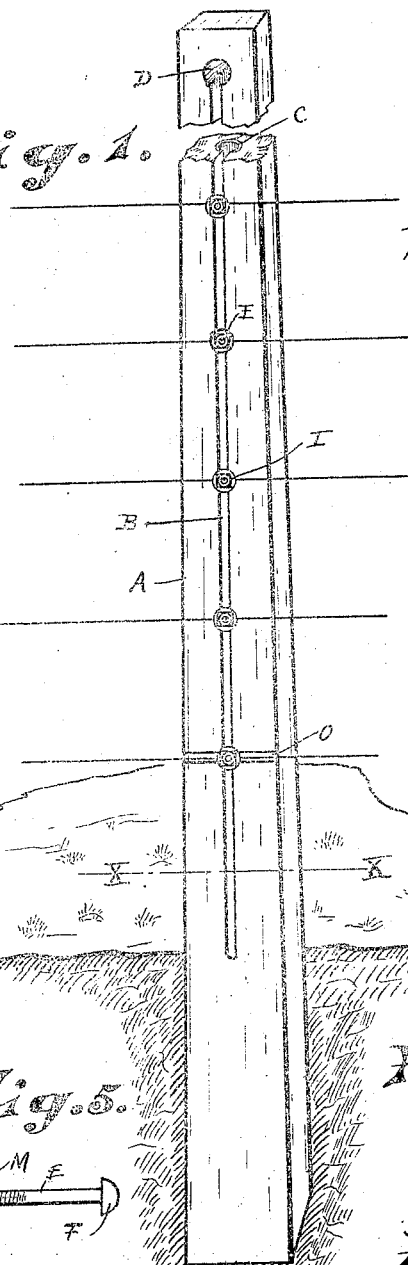
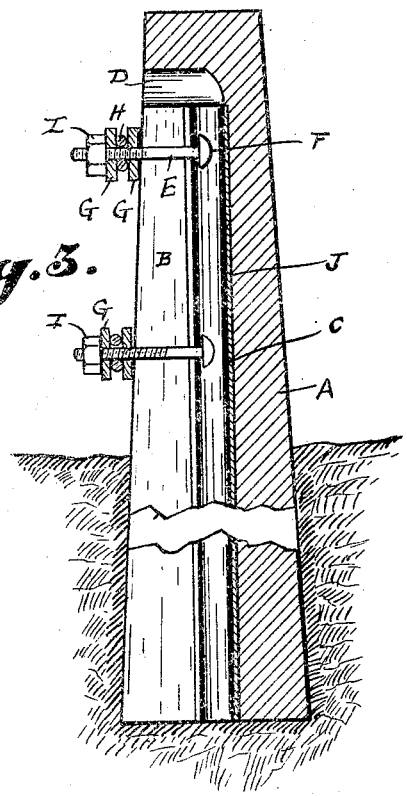
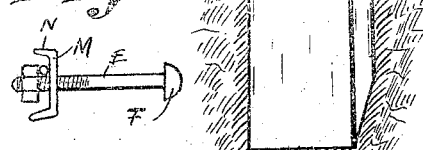
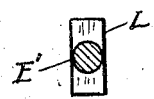
INVENTOR
Charles S. Dougherty
BY
Erwin & Wheeler
ATTORNEYS
WITNESSES:

UNITED STATES PATENT OFFICE.

CHARLES S. DOUGHERTY OF MILWAUKEE, WISCONSIN.

FENCE-POST.

No. 877,638.  Specification of Letters Patent.  Patented Jan. 28, 1908.

Application filed June 20, 1907. Serial No. 379,861.

*To all whom it may concern:*

Be it known that I, CHARLES S. DOUGHERTY, a citizen of the United States, residing at Milwaukee, county of Milwaukee, and State of Wisconsin, have invented new and useful Improvements in Fence-Posts, of which the following is a specification.

My invention relates to improvements in cement posts.

The object of my invention is to provide a form of cement post which can be made at a minimum cost with maximum strength, and in which a wholly embedded metallic reinforcing member is made to not only serve as such, but to form an interior channel communicating with a longitudinal slot in one wall of the post in such a manner as to permit the wires to be secured to the posts by ordinary bolts or bolts and clamping members, such as washers, either plane surfaced or grooved, and which can be removed and replaced at pleasure.

In the following description reference is had to the accompanying drawings in which, Figure 1 is a face view of a post embodying my invention, partially broken away at the upper end to show the reinforcing member, and channel. Fig. 2 is a sectional view drawn on line x—x of Fig. 1. Fig. 3 is a longitudinal sectional view drawn to a plane cutting the bolt receiving slot and channel. Fig. 4 is a detail view showing a modified form of bolt head. Fig. 5 is a detail view showing a modified form of washer or clamping member in its relation to the bolt nut and wire.

Like parts are identified by the same reference characters throughout the several views.

The post illustrated is substantially square in cross section but the exterior contour is not essential to this invention. The body A of the post is formed of cement or concrete and is provided with a slot B in one side which extends inwardly to a channel C of greater diameter than the width of the slot. At its upper end the channel C and slot B terminate in an aperture D adapted to permit the insertion of bolt heads to the channel C. Bolts E having heads F in the channel C extend outwardly through the slot B and are provided with washers G which are adapted to be clamped upon the wire by means of an exterior nut I. The bolts may be moved vertically in the slot B and the wire secured between the washers by tightening the nut I at the desired point.

The metallic reinforcing member J is preferably employed and when used forms a lining for the channel C. This reinforcing member may consist of split tubing disposed at or about the longitudinal center of the post with the split or opening in the tubing registering with the slot B. Where such tubing is used, the channel C will of course be cylindrical in cross section, although this form is not essential, since any channel of greater diameter than the width of the slot B will serve the purpose. In casting the post, the reinforcing member J is inserted and used as a core piece, a removable core piece being employed and extending in the member J and outwardly to the adjacent wall of the post. This core piece when removed forms the slot B.

If desired, the opening D may be omitted and a bolt E' having a rectangular head L may be used, (see Fig. 4), the head being adapted in one position of adjustment to pass through the slot B and then turned to extend across the slot within the channel C.

In Fig. 5, I have illustrated a form of clamping member M which may be employed in connection with either of the bolts E or E' and which is provided with outwardly extending projections N adapted to receive the wire between one of them and the bolt E, the nut being turned up against the wire when it extends in proximity to the projections N, whereby the wire will not be released even though it should become loose.

Various other styles of clamping members may be employed, the specific form of member being immaterial to my invention. The nut itself may serve as a clamping member to bind the wire against the face of the post, and the additional clamping members illustrated may in such case be dispensed with, especially if the face of the post be transversely grooved as illustrated at O, in Fig. 1.

The reinforcing member preferably extends to the lower end of the post while the slot B terminates at or near the ground line. Both the slot and the channel preferably terminate below the upper end of the post, leaving the upper end solid as shown.

With the above described construction the reinforcing member may be of thin material such as sheet iron bent into the form of a split tube having sufficient strength to preserve the shape of the channel or cavity in the post. This metallic member not only serves as a core or molding the post but the adhesion of the concrete thereto is such that each materially strengthens the other, the concrete preventing the metal from bending and the metal preventing transverse fractures in the concrete, either under the stress of the bolt heads or under lateral strains on the post itself. The concrete body wholly incloses the metallic lining so that no metal parts are exposed at the exterior surface of the post except the bolt ends and the clamping devices.

Having thus described my invention what I claim as new and desire to secure Letters Patent is,

1. A post comprising a concrete body provided with an interior longitudinally extending channel and having a slot leading outwardly from said channel through one wall of the post, with the channel extending laterally in the body of the post on both sides of the slot, a slotted metallic lining for said channel, wholly inclosed by the concrete body, bolts provided with heads engaged in said channel, said bolts extending outwardly therefrom through the slot, and a wire clamping device at the outer ends of said bolts, said slot and channel being adapted to receive ordinary bolts and bolt heads respectively.

2. A post comprising a concrete body provided with an interior longitudinally extending channel and having a slot leading outwardly from said channel through one wall of the post and intermediate of the ends of the post, said channel being of greater diameter than said slot and said post having an aperture of substantially the same diameter as the channel leading therefrom through the concrete wall of the post, a slotted metallic lining for said channel, wholly inclosed by the concrete body bolts, extending through said slot with heads engaging in said channel, and wire clamping devices on the outer ends of said bolts.

In testimony whereof I affix my signature in the presence of two witnesses.

CHARLES S. DOUGHERTY.

Witnesses:
N. J. HARDEN,
LEVERET C. WHEELER.